No. 785,801. PATENTED MAR. 28, 1905.
S. D. DAVIS & J. H. CULVER.
COMBINED INTRENCHING IMPLEMENT AND TENT PIN PULLER.
APPLICATION FILED SEPT. 19, 1904.
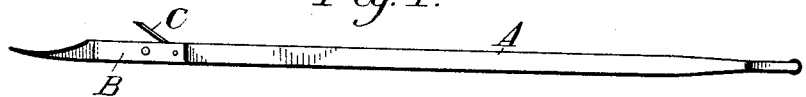
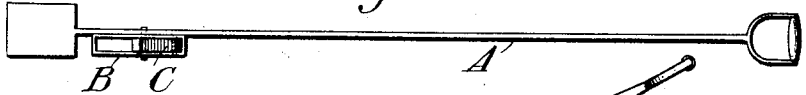
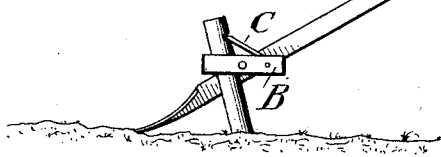
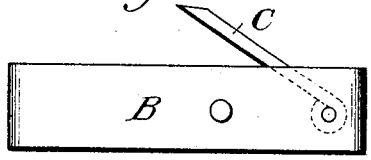
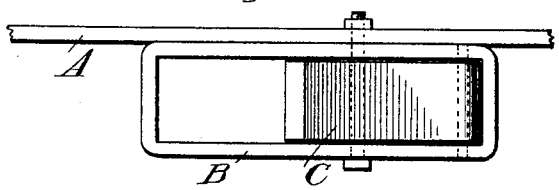
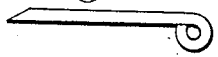
Witnesses:
N. S. Wiggins
W. R. McLaughlin
Inventors.
Samuel D. Davis,
Jacob H. Culver, No. 785,801. Patented March 28, 1905.

UNITED STATES PATENT OFFICE.

SAMUEL D. DAVIS, OF WILBER, AND JACOB H. CULVER, OF LINCOLN, NEBRASKA.

COMBINED INTRENCHING IMPLEMENT AND TENT-PIN PULLER.

SPECIFICATION forming part of Letters Patent No. 785,801, dated March 28, 1905.

Application filed September 19, 1904. Serial No. 225,155.

*To all whom it may concern:*

Be it known that we, SAMUEL D. DAVIS, of Wilber, Saline county, and JACOB H. CULVER, of Lincoln, Lancaster county, Nebraska, have invented a Combined Intrenching Implement and Tent-Pin Puller; and we do hereby declare the following description and drawings heretofore filed as sufficient to enable any person skilled in the art or science to which it most nearly appertains to make and use our said invention or improvement without further invention or experiment.

The object of our invention is to provide a combined implement that can be used as an intrenching implement and also for pulling tent-pins; and it consists of a steel lever having at one end a spade or cutting-blade and at the other a hand-grip similar to a common spade. On the left side of this lever or handle at a point eleven inches from the point of the spade or lower end of the lever is attached a steel link five inches in length and sufficiently wide to pass down over a tent-pin. This link is pivoted to the lever by a bolt which passes through both sides of the link and through the lever and is held in place by a nut, the holes in the link being two inches from the upper end. A ratchet-dog is attached within the link at the upper end, reaching down to within one and one-fourth inches of the lower end of the link, the bolt or pivot connecting the link to the lever constituting a stop for the ratchet-dog and the lower portion of the link constituting an abutment, between which and the ratchet-dog an object may be clamped.

To more fully describe our invention, reference is had to the drawings, with the letters thereon, forming a part of this specification, of which—

Figures 1, 2, and 3 show different views of the implement. Fig. 4 is a side view of the link detached from the lever with ratchet-dog raised; Fig. 5, a sectional top view of the lever and link with ratchet-dog down; Figs. 6 and 7, ratchet-dog detached.

The letters A, B, and C (shown in Figs. 1 to 7, respectively) are as follows: A, the lever; B, the link; C, the ratchet-dog and link.

To operate the device as a tent-pin puller, the link is dropped over the pin, the lever being down, and when the lever is raised the ratchet-dog engages the pin, the link tips down at the lower end, the square edges coming in contact with the opposite side of the pin, forming an abutment. It causes it to grip and firmly hold the pin while it is being drawn out.

This implement consists of the above-described parts—viz., the lever, the link, and ratchet-dog combined—and is designed to be used in pulling tent-pins, ditching tents, digging intrenchments, and tunnels and is especially adapted for digging in hard earth or clay.

Having thus described our invention, what we claim, and desire to secure by Letters Patent, is—

The combination of a lever with a link pivoted thereto, and a dog pivoted within and to the link, the pivot connecting the link to the lever constituting a stop for the dog and a portion of the link constituting an abutment between which and the dog an object may be clamped.

SAMUEL D. DAVIS.
J. H. CULVER.

Witnesses:
FRED D. CULVER,
ERNEST H. PHELPS.